United States Patent Office 3,620,030
Patented Nov. 16, 1971

3,620,030
METHOD OF PURIFYING VINYL FLUORIDE CONTAMINATED WITH IMPURITIES BY DISTILLATION IN THE PRESENCE OF CARBON DIOXIDE OR TRIFLUOROMETHANE
Yuichi Iikubo, Takuji Nishida, and Yoshiki Furukawa, Onoda, Japan, assignors to Onoda Cement Company, Limited, Yamaguchi, Japan
Filed Jan. 10, 1969, Ser. No. 790,416
Claims priority, application Japan, Jan. 12, 1968, 43/1,322
Int. Cl. F25j 3/08
U.S. Cl. 62—11
7 Claims

ABSTRACT OF THE DISCLOSURE

Vinyl fluoride containing impurities such as acetylene and hydrogen fluoride is purified by distilling the gaseous mixture of vinyl fluoride and such impurities in the presence of a carbon dioxide gas or trifluoromethane.

BACKGROUND OF THE INVENTION

This invention relates to a method for purifying contaminated vinyl fluoride containing impurities such as acetylene and hydrogen fluoride by distilling a gaseous mixture of vinyl fluoride and other impurities present in the vinyl fluoride as a result of its preparation.

When vinyl fluoride is manufactured by the reaction of hydrogen fluoride and acetylene or by the thermal decomposition of 1,1-difluoroethane, the resultant vinyl fluoride is contaminated with impurities such as unreacted acetylene, undecomposed 1,1-difluoroethane and fluorinated hydrocarbons which are produced as by-products. Such impurities reduce the polymerization speed of vinyl fluoride and promote a chain transfer reaction, and as a result, the polymerized vinyl fluoride has a low molecular weight and inferior physical properties.

It has been proved by our investigations that the polymerization speed of vinyl fluoride is reduced by about 10% when the vinyl fluoride is contaminated with acetylene in an amount of about 0.04 mol percent. It has also been proved that the polymerization speed of vinyl fluoride is not affected even when the vinyl fluoride is contaminated with 1,1-difluoroethane in the amount of 1 mol percent, but the resultant polymerized vinyl fluoride has a low molecular weight, and the intrinsic viscosity ($\mu$=1.0) of the polyvinyl fluoride is reduced to 0.8. Thus, it is necessary to remove such impurities, as mentioned above, from the contaminated vinyl fluoride before it is polymerized.

Certain water soluble impurities such as hydrogen fluoride can be removed by washing with water and also, vinyl fluoride can easily be separated from other fluorinated hydrocarbons by distilling a mixture of vinyl fluoride and the fluorinated hydrocarbons, because the former has a boiling point which is distinguishable from the boiling point of the latter. Thus vinyl fluoride has a boiling point of $-72°$ C., whereas the boiling of the 1,1-difluoroethane is $-24.7°$ C. and also the mixtures of these compounds do not form azeotropes.

Vinyl fluoride, however, has a boiling point close to the boiling point, $-80°$ C., of acetylene, and therefore, a process for separating acetylene from a mixture of vinyl fluoride and acetylene must be conducted under pressure because they cannot exist in the liquid state at atmospheric pressure. It must be noted, however, that acetylene gas is explosive at atmospheric pressure, and particularly at high pressure, and therefore it is necessary to avoid the distillation of acetylene under pressure.

Heretofore, there have been proposed several methods, as listed below, for removing acetylene from a gaseous mixture of vinyl fluoride and acetylene.

(1) The method wherein a chemical reaction between a cuprous salt and acetylene is carried out.

(2) The method involving the use of a selective solvent which is mixed with acetylene and then the solvent is removed from the mixture under distillation.

(3) The method wherein an acetylene distillate which contains a considerable amount of vinyl fluoride is recovered.

Method 1 is not economical as it is necessary to use high priced cuprous salt and thus method 1 is not practical and not used commercially, particularly where the acetylene content is relatively large.

Method 2 is preferable if a suitable solvent having the necessary selectivity is found. Suggested solvents include acetone, dimethylformamide and 2-methyl pyrrolidone but such solvents require elevated temperatures for their distillation. Therefore, method 2 has certain defects in that vinyl fluoride is found in the distillate and also that a reduction or inversion of the selectivity of the solvent results and thus this method is not always desirable in practice.

Method 3 is a practical process when the acetylene content is low, but it causes the loss of yield of vinyl fluoride when the acetylene content is high. Even if the acetylene-containing vinyl fluoride can be recycled into the synthetic reaction for the preparation of vinyl fluoride, this method has certain defects, namely the space velocity must be increased in the reaction system, the partial pressure of the reaction components is reduced and the resultant vinyl fluoride is decomposed. Therefore, method 3 is not economical.

SUMMARY OF THE INVENTION

A principal object of the present invention is the provision of a method for purifying vinyl fluoride containing impurities such as acetylene and hydrogen fluoride wherein the above mentioned disadvantages are avoided.

Another object of the present invention is the provision of an economical and effective process for purifying vinyl fluoride contaminated with acetylene and other impurities.

It has been discovered that contaminated vinyl fluoride containing acetylene and other impurities such as fluorinated hydrocarbons may be purified by distilling the contaminated vinyl chloride in the presence of carbon dioxide or trifluoromethane thereby to dilute the concentration of the acetylene with said carbon dioxide or said trifluoromethane.

This method can be carried out under pressure without causing acetylene to explode.

This invention, therefore, provides a method of purifying a contaminated gaseous mixture containing vinyl fluoride and impurities such as acetylene and hydrogen fluoride by distilling the gaseous mixture in the presence of a carbon dioxide gas or trifluoromethane, whereby a mixture of acetylene and carbon dioxide or trifluoromethane is distilled and thereby separated from the vinyl chloride.

DESCRIPTION OF THE PREFERRED EMBODIMENTS

Figure 1:
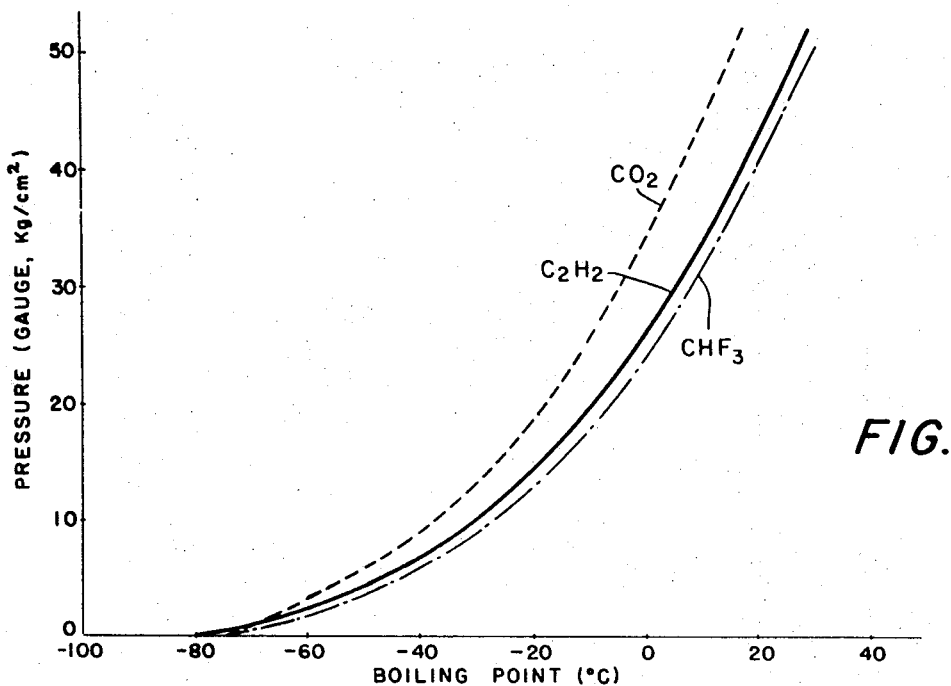
FIG. 1 shows graphically the change in boiling point with pressure of carbon dioxide, acetylene and trifluoromethane, respectively.

This invention is based on the fact that under atmospheric pressure carbon dioxide gas has a boiling point of −78° C., and trifluoromethane has a boiling point of −84° C., which boiling points are close to the boiling points are close to the boiling point, −84° C., of acetylene. Further, it has been found that under pressure, i.e. above atmospheric pressure while the boiling points of each of these compounds change, the boiling points are similar to each other over a wide range of pressure as shown in FIG. 1. Thus, according to the process of this invention, vinyl fluoride contaminated with acetylene and other impurities such as fluorinated hydrocarbons is distilled in the presence of carbon dioxide or trifluoromethane to produce a distillate containing a mixture of acetylene and carbon dioxide or trifluoromethane. Vinyl fluoride free of acetylene is then obtained as a result of the distillation. If the vinyl fluoride contains other impurities, higher boiling than vinyl fluoride such as the aforementioned fluorohydrocarbons for example, 1,1-difluoroethane, the vinyl fluoride may be subjected to another distillation to separate the vinyl fluoride from these higher boiling impurities.

According to a preferred aspect of the present invention, the acetylene in the distillate may be separated from the carbon dioxide, or trifluoromethane, the mixture distilled during the separation of vinyl fluoride from acetylene, by treatment of the mixture with a selective solvent for extracting the acetylene.

The solvents used in this invention for extracting acetylene include compounds having a selectivity index value of above 1 as calculated by the following equation.

Selectivity Index Value =

$$\frac{\text{Carbon dioxide or trifluoromethane contained in the gaseous phase}}{\text{Acetylene contained in the gaseous phase}} \bigg/ \frac{\text{Carbon dioxide or trifluoromethane contained in the liquid phase}}{\text{Acetylene contained in the liquid phase}}$$

Figure 2:
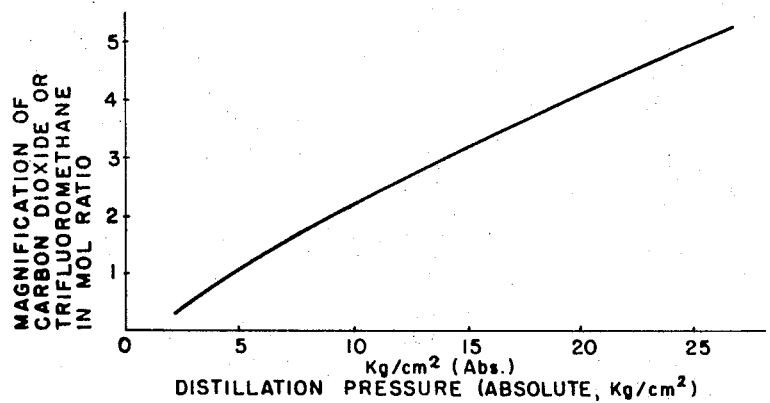
FIG. 2 shows graphically the relationship of magnification value of the mol ratio of carbon dioxide or trifluoromethane with respect to acetylene and distillation pressure.

Preferably carbon dioxide or trifluoromethane is added to a gaseous mixture of vinyl fluoride and acetylene in excess of 1.5 times the amount by weight of the acetylene contained in said gaseous mixture. If the carbon dioxide or trifluoromethane is added to the gaseous mixture in a large excess of the amount of the acetylene contained in the gaseous mixture, the carbon dioxide or trifluoromethane may be added intermittently during distillation. Also it is preferable to use a distilling pressure of above 2 kg./cm.$^2$ and particularly 5 to 20 kg./cm.$^2$ (absolute). FIG. 2 shows the relationship between the distillation pressure and the magnification value of the mol ratio of carbon dioxide or trifluoromethane to acetylene which is desirable for carrying out the distillation operation with safety.

The solvents used in this invention must have a selectivity index value of above 1 when they are added to a mixture of acetylene and carbon dioxide gas or trifluoromethane; if the solvents have a selectivity index value of 1, the acetylene cannot be separated from the carbon dioxide or the trifluoromethane. In practice, it is preferable to use solvents having a selectivity index value of above about 1.5 and particularly above 2.0. Such solvents include aromatic hydrocarbons such as toluene, and aliphatic polar compounds such as aliphatic alcohols, ketones and the like, for example, methanol, ethanol, acetone and methyl ethyl ketone when the solvents are to be used for extracting acetylene from mixtures containing carbon dioxide. Solvents used in this invention also include aromatic and aliphatic hydrocarbons such as benzene, toluene, n-hexane and cyclohexane, and halogenated hydrocarbons such as carbon tetrachloride, chloroform, ethylene dichloride, ethyl chloride and ethyl bromide when said solvent is to be used for extracting acetylene from mixtures containing trifluoromethane.

The selectivity index values designated as some of the solvents used in this invention are given in the following Table 1, with respect to mixtures of acetylene and carbon dioxide or trifluoromethane.

TABLE 1

(a) Solvents Added to a Mixture of Acetylene and Carbon Dioxide

Toluene

| Pressure (gauge, kg./cm.$^2$): | S.I.V. |
|---|---|
| 3 | 1.9 |
| 5 | 1.9 |
| 8 | 1.9 |
| 10.5 | 1.8 |

Methanol

| Pressure (gauge, kg./cm.$^2$): | S.I.V. |
|---|---|
| 3.3 | 2.5 |
| 5.2 | 2.5 |
| 8.3 | 2.5 |
| 10.75 | 2.4 |

Acetone

| Pressure (gauge, kg./cm.$^2$): | S.I.V. |
|---|---|
| 4 | 3.3 |
| 7 | 4.6 |
| 10 | 2.0 |

(b) Solvents Added to a Mixture of Acetylene and Trifluoromethane

Toluene

| Pressure (gauge, kg./cm.$^2$): | S.I.V. |
|---|---|
| 3 | 1.8 |
| 5.5 | 1.8 |
| 7.8 | 1.9 |
| 10 | 1.9 | n-Hexane

| Pressure (gauge, kg./cm.$^2$): | S.I.V. |
|---|---|
| 3 | 1.9 |
| 4.8 | 2.1 |
| 8.8 | 1.8 |
| 10.7 | 1.8 |

Benzene

| Pressure (gauge, kg./cm.$^2$): | S.I.V. |
|---|---|
| 2.5 | 2.1 |
| 5 | 2.1 |
| 7.1 | 2.1 |
| 9.6 | 1.6 |

Cyclohexane

| Pressure (gauge, kg./cm.$^2$): | S.I.V. |
|---|---|
| 2.9 | 2.2 |
| 5 | 2.2 |
| 6.6 | 2.2 |
| 9.8 | 2.2 |

Carbon tetrachloride

| Pressure (gauge, kg./cm.$^2$): | S.I.V. |
|---|---|
| 3 | 2.0 |
| 4.9 | 2.0 |
| 7.4 | 2.3 |
| 10.3 | 2.1 |

Chloroform

| Pressure (gauge, kg./cm.²): | S.I.V. |
|---|---|
| 3.2 | 2.9 |
| 7.2 | 3.3 |
| 10.2 | 2.7 |
| 14.7 | 2.3 |
| 19.3 | 2.3 |
| 25.3 | 2.0 |
| 30.2 | 1.8 |

Ethyl bromide

| Pressure (gauge, kg./cm.²): | S.I.V. |
|---|---|
| 3 | 2.3 |
| 5 | 2.0 |
| 8 | 2.0 |
| 9.2 | 1.9 |

The solvent is preferably added in an amount of about 10 to 200 times the amount by weight of the acetylene contained in the mixture of the acetylene and the carbon dioxide or trifluoromethane.

This invention is further described by reference to the accompanying FIG. 3 which shows an installation which may be used for carrying out the process of this invention. In this installation, a fractional distillation tower A for separating acetylene is provided with an inlet 3 for charging contaminated vinyl fluoride at the central portion of the tower and an inlet 2, which is between the inlet 3 and the top of said tower for charging carbon dioxide gas or trifluoromethane. The tower is operated by introducing a mixture of vinyl fluoride, and impurities, such as fluorinated hydrocarbons and acetylene (the mixture is previously deacidified and dried) through the inlet 3 and simultaneously by introducing carbon dioxide gas or trifluoromethane through the inlet 2. Distillation is carried out in tower A at a pressure varying from atmospheric pressure to 20 kg./cm.² (absolute), and preferably from about 5 to 15 kg./cm.² (absolute). Vinyl fluoride which does not contain acetylene, but which may contain fluorinated hydrocarbons which have boiling points higher than the boiling point of vinyl fluoride is removed from the bottom of the fractional distilling tower A. If the vinyl fluoride is mixed with fluorinated hydrocarbons, this mixture is fed into a second fractional distilling tower B at the central portion 5 of tower B. Purified vinyl fluoride is recovered from the top 6 of the tower B and the fluorinated hydrocarbons are separated from the bottom 7 of the tower B. If the fractional distillation tower A is charged with a mixture of vinyl fluoride and acetylene, i.e., higher boiling components such as fluorinated hydrocarbons are not present, then the second fractional distillation tower B may be eliminated. A mixture of acetylene and carbon dioxide or trifluoromethane is distilled from the top 4 of the fractional distilling tower A and fed into the central portion of an extracting tower C which is provided with the inlet 10. Into the tower C is charged a solvent from the inlet 9 disposed between the inlet 10 and the top 11 of tower C. Carbon dioxide or trifluoromethane is distilled from the top 11 and then is fed back to the tower A by passing through the pipe 1 and the inlet 2. The solvent absorbs acetylene contained in tower C and the resultant mixture of the solvent and acetylene is recovered from the bottom of tower C and is fed into an evaporating tower D through the inlet 12 at the central portion of tower D. The evaporating tower D is operated at a pressure of atmospheric to 2 kg./cm.² (absolute), and the acetylene is removed from the top 13 of tower D and the solvent is removed from the bottom 14 of tower D. The product contains no acetylene or a small amount of acetylene and is fed back to the extracting tower C by passing through the pipe 8.

The invention is further illustrated by the following examples which are illustrative of the best mode contemplated for carrying out the present process, but which must not be construed as limiting the scope of the invention in any manner whatsoever.

EXAMPLE 1

Figure 3:
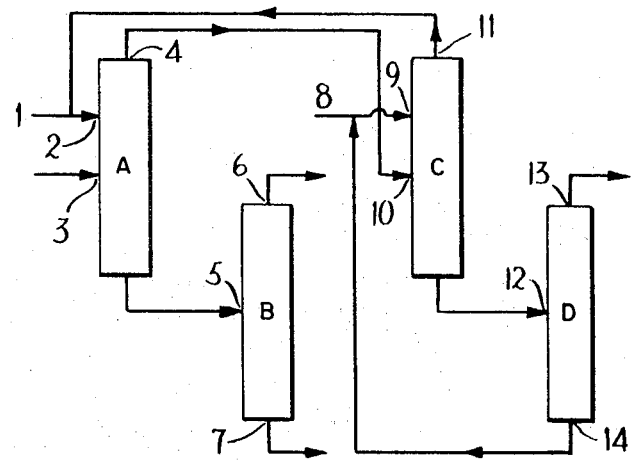
FIG. 3 is a flow diagram which illustrates schematically an installation which may be used to carry out the process of this invention.

This example was carried out by using a synthesized gaseous mixture containing 10% acetylene, 85% vinyl fluoride and 5% 1,1-difluoroethane in combination with a minor amount of compounds having high boiling points, in the presence of a carbon dioxide gas, and using the operation system shown in FIG. 3.

The synthesized gaseous mixture was previously deacidized and dried, and then the dried gaseous mixture was charged into the fractional distilling tower A from the inlet 3 at the rate of 7.5 mols per hour and simultaneously the carbon dioxide was charged into tower A from the inlet 2 at the rate of 3.5 mols per hour. The tower A had a diameter of 2.2 cm. and a length of 250 cm. and it was operated at a pressure of 13.5 kg./cm.² (gauge), a temperature of −30° C. at the top 4 and a temperature of 5° C. at the bottom. Test samples were taken respectively from the bottom, the top and the portion 30 cm. above the inlet 3, and the samples were analyzed by gas chromatography. The test results are given in the following Table 2.

TABLE 2

| | Components | | | |
|---|---|---|---|---|
| Samples | Acetylene (percent) | $CO_2$ (percent) | Vinyl fluoride (percent) | 1,1-difluoro ethane and others (percent) |
| Liquid sample taken from the top | 17.1 | 82.9 | 0.00 | 0.00 |
| Sample taken from the portion of 30 cm. above of the inlet 3 | 3.2 | 36.3 | 60.5 | 0.00 |
| Liquid sample taken from the bottom | 0.000 | 0.000 | 93.5 | 6.5 |

A product which was separated from the bottom of tower A was charged into the second fractional distilling tower B having a diameter of 2.2 cm. and a length of 290 cm. and then the product was fractionally distilled to produce a 99.99% vinyl fluoride which did not contain acetylene.

A product which was separated from the top of tower A was charged into the extracting tower C which was 2.2 cm. in diameter and 250 cm. in length, and simultaneously, methyl alcohol was charged into tower C at the rate of 1,900 cc. per hour. Tower C was operated at a pressure of 11 kg./cm.² (gauge), a temperature of −7° C. at the top 11 and a temperature of 128° C. at the bottom. Test samples were taken from the top and the bottom of the tower C and they were analyzed as shown in the following Table 3.

TABLE 3

| Components | Acetylene (percent) | $CO_2$ (percent) |
|---|---|---|
| Gas taken from the top of the tower | 0.4 | 99.6 |
| Gas taken from the bottom of the tower | 99.8 | 0.2 |

The product which was taken from the bottom of the extracting tower C was charged into the evaporating tower D which was 3.3 cm. in diameter and 150 cm. in length. The tower D was operated at a pressure of 0.5 kg./cm.² (gauge), a temperature of −30° C. at the top 13 and a temperature of 65° C. at the bottom 14 of the tower D, thereby removing the acetylene containing a minor amount of the methyl alcohol from the top of tower D which is absorbed with active carbon, and recovering methyl alcohol from the bottom of tower D.

The system as shown in FIG. 3 was operated continuously for 100 hours by using 33.8 kg. of the synthesized, dried gaseous mixture mentioned above, 15.4 kg. of a carbon dioxide gas and 190 liters of methyl alcohol, with the result that 29.3 kg. of pure vinyl fluoride, 2.4 kg. of high boiling compounds, 15.3 kg. of carbon dioxide gas (99.6% purity), 1.64 m.$^3$ of acetylene and 189 liters of methyl alcohol were obtained.

EXAMPLE 2

This example was carried out by using a synthesized gaseous mixture containing a 10.6% acetylene, a 89.4% vinyl fluoride and other impurities in the presence of trifluoromethane, and using the operation system shown in FIG. 3.

The synthesized gaseous mixture was previously deacidized and dried, and then the dried gaseous mixture was charged into the fractional distilling tower A as shown in Example 1 at a pressure of 11.5 kg./cm.$^2$ (gauge), a temperature of −31° C. at the top, a temperature of −5° C. at the bottom of the tower and a rate of 7.5 mols per hour and at the same time, trifluoromethane was charged into tower A at the rate of 2 mols per hour. In this case, the purity of vinyl fluoride was increased to 99.99% or more and acetylene and trifluoromethane contained in the vinyl fluoride were not detected by gas chromatography.

The product which was taken from the top of tower A was continuously charged into the extracting tower C as shown in Example 1 at a pressure of 10 kg./cm.$^2$ (gauge), a temperature of 12° C. at the top and a temperature of 130° C. at the bottom, and at the same time chloroform was charged into tower C at the rate of one liter per hour. Test samples which were taken from the top and the bottom of the extracting tower C were analyzed as given in the following Table 4.

TABLE 4

| Components | Acetylene (percent) | Trifluoro-methane (percent) | Vinyl fluoride (percent) | Others (percent) |
|---|---|---|---|---|
| Gas taken from the top | 0.00 | 98.8 | 0.00 | 1.2 |
| Gas taken from the bottom | 99.3 | 0.5 | 0.00 | 0.2 |

Trifluoromethane was recovered from the top of the extracting tower C and the gaseous product taken from the bottom of the extracting tower C was charged into the evaporating tower D as shown in Example 1 at a pressure of 0.5 kg./cm.$^2$ (gauge), a temperature of −30° C. at the top of the tower and a temperature of 61° C. at the bottom of said tower. The acetylene was recovered from the top of the evaporating tower D and the chloroform was recovered from the bottom of tower D.

The system shown in FIG. 3 was operated continuously for 48 hours by using 15.8 kg. of the synthesized, dried gaseous mixture mentioned above, 6.7 kg. of trifluoromethane and 48 liters of chloroform, with the result that 14.7 kg. of pure vinyl fluoride, 6.6 kg. of trifluoromethane, 7.5 liters of chloroform and 0.92 m.$^3$ of acetylene were obtained.

What we claim and desire to secure by Letters Patent is:

1. A method for purifying a contaminated gaseous mixture containing vinyl fluoride as the principal component and impurities including acetylene which comprises separating said acetylene from said vinyl fluoride by distilling said gaseous mixture in the presence of a member of the group consisting of carbon dioxide gas and trifluoromethane at a pressure of about atmospheric to 20 kg./cm.$^2$ (gauge), and thereby obtaining a distillate containing a mixture of acetylene and either carbon dioxide or trifluoromethane.

2. A method according to claim 1 in which said distillation is carried out in the presence of carbon dioxide.

3. A method according to claim 1 in which said distillation is carried out in the presence of trifluoromethane.

4. A method according to claim 1 in which the impurities contained in said gaseous mixture include a component having a higher boiling point than vinyl fluoride and in which, after the separation of said acetylene, the thus-treated vinyl fluoride is subjected to another distillation to separate the vinyl fluoride from said higher boiling component.

5. A method according to claim 1 in which the impurities contained in said gaseous mixture include hydrogen fluoride, and in which prior to said distillation, the gaseous mixture is deacidified and dried.

6. A method according to claim 1 in which said acetylene is distilled in the presence of carbon dioxide whereby said distillate contains a mixture of acetylene and carbon dioxide and the mixture is separated by extraction with a selective solvent selected from the group consisting of toluene, methanol and acetone.

7. A method according to claim 1 in which said acetylene is distilled in the presence of trifluoromethane whereby the said distillate contains a mixture of acetylene and trifluoromethane and in which the mixture is separated by extraction with a selective solvent selected from the group consisting of toluene, n-hexane, benzene, cyclohexane, carbon tetrachloride, chloroform and ethyl bromide.

References Cited

UNITED STATES PATENTS 3,397,247  8/1968  Begley et al. _____ 260—653.4

FOREIGN PATENTS 1,341,805  9/1963  France _____ 260—653.3

DANIEL D. HORWITZ, Primary Examiner